Dec. 27, 1932.   D. B. GARDNER   1,892,142
APPARATUS FOR CONTROLLING AND DIRECTING LIGHT
Filed June 16, 1930   2 Sheets-Sheet 2
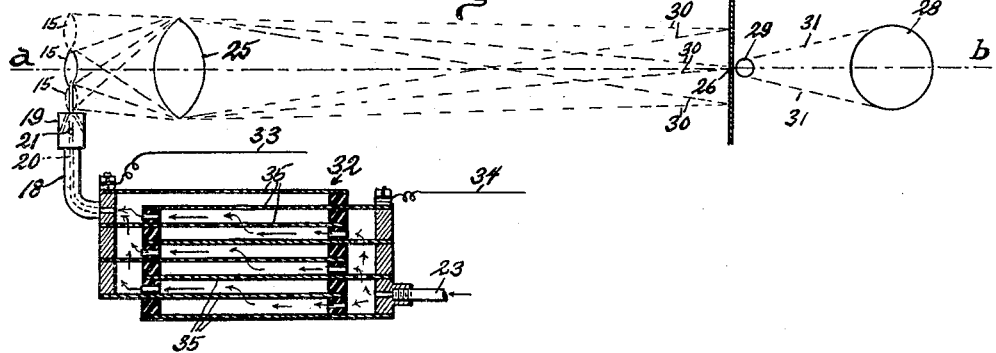
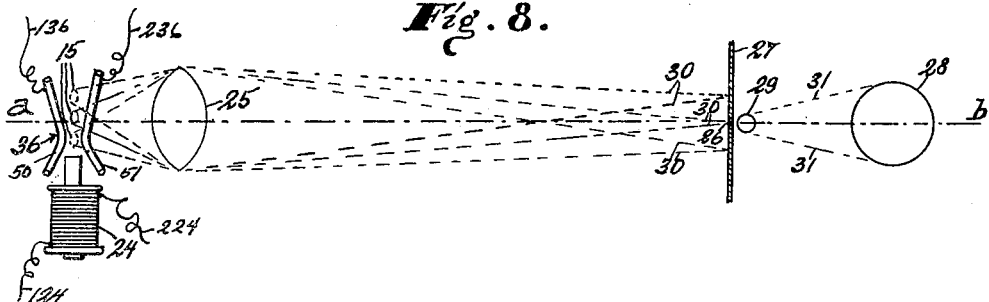
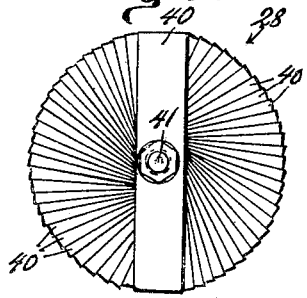
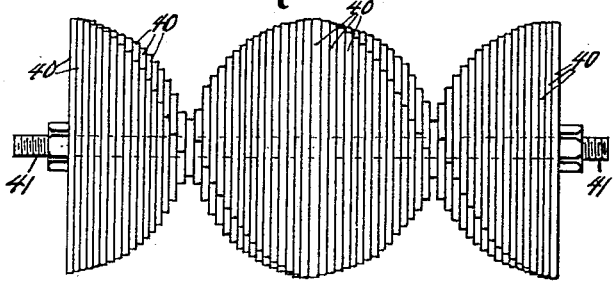
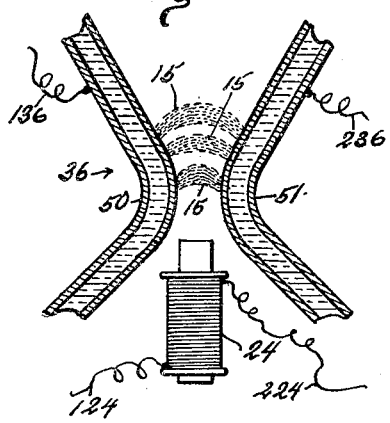
Inventor.
Delamere B. Gardner.
by
Lockwood & Lockwood,
His Attorneys.

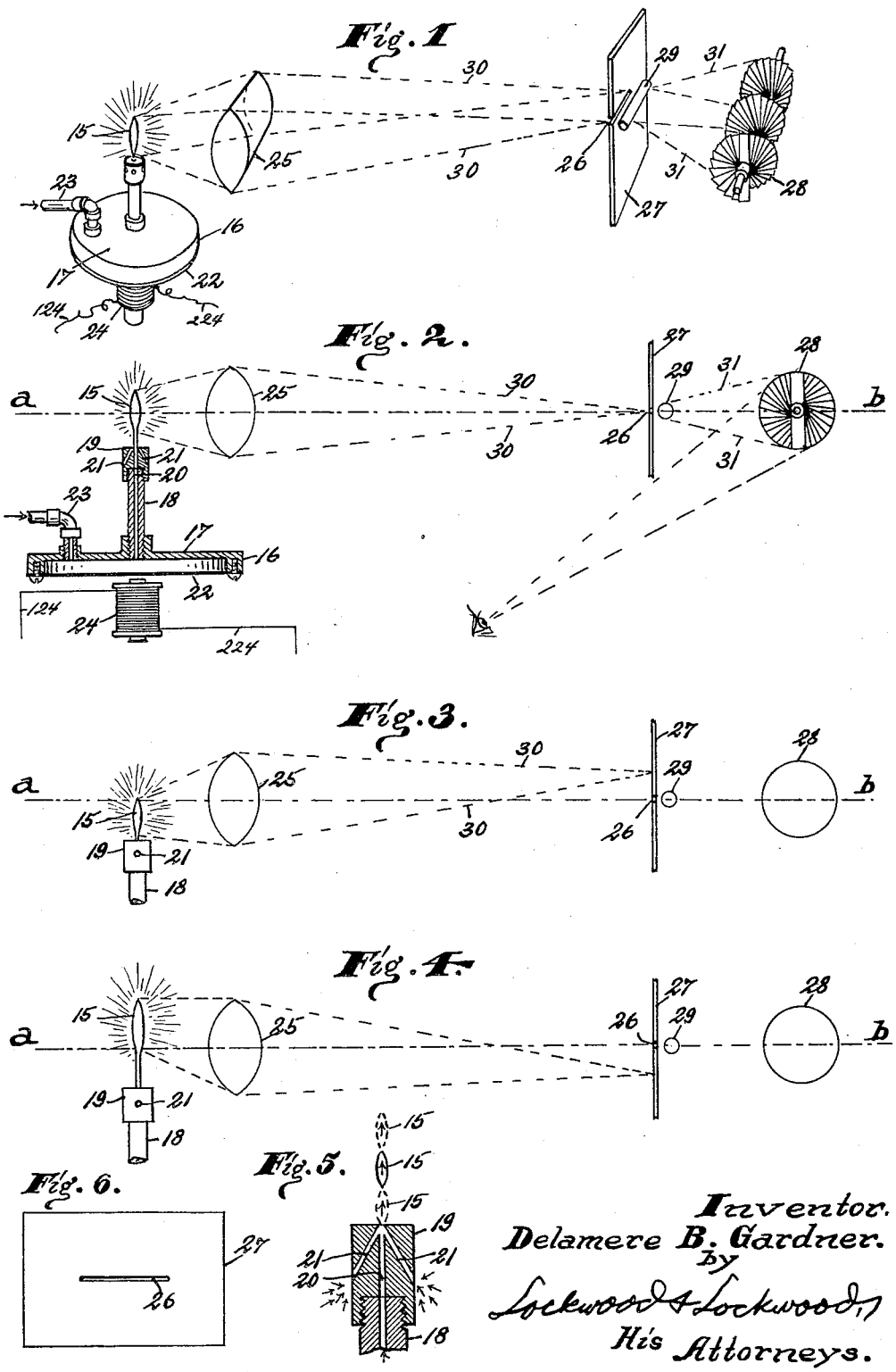

Patented Dec. 27, 1932

1,892,142

UNITED STATES PATENT OFFICE

DELAMERE B. GARDNER, OF LOS ANGELES, CALIFORNIA

APPARATUS FOR CONTROLLING AND DIRECTING LIGHT

Application filed June 16, 1930. Serial No. 461,406.

This invention relates to an apparatus for use in television and the principal object is to provide an apparatus for controlling and directing light of high candle power so its rays will focus toward a partition with a slot therethrough that is of some length and minute width, with means for sweeping the light across the slot so, that intermittently passing through the slot, it can be used for sending and receiving a scene by television so as to make clearly visible all of the scene in the characteristics of the dot size area spaces successively focused.

As is well known the act of receiving a scene in television is accomplished by photographically exposing succeeding dot size areas of the scene to flashes of light in a prearranged order that will cover the entire scene, which small areas when rapidly and orderly run together again in reproduction will make the whole scene visible. However, the light flashes heretofore employed in the receiving work of television have been too weak to clearly and effectively bring out in satisfactory photographic distinctness all the characteristics of the dot sized areas so that television scenes heretofore have been blurred and relatively indistinct and lacking in detail and, as stated, one of the principal objects of this invention is to provide a light flash strong enough and close enough to the mirror to bring out all of the characteristics of the dot size areas in clear complete detail so that when run together the scene will be clearly visible.

To the foregoing end I provide a simple means for producing a sheet of light of high candle power and directing its rays toward a focal line slightly beyond a slot in a partition so that the light passing through the slot is highly luminous and this light is interrupted by a glow bar arranged to close the slot and transfer the light in flashes to a rotary mirror; and in operative connection with the foregoing means I provide another simple means for fluctuating the high candle power light to sweep its concentrated rays across the slot to intermittently illuminate the glow bar and flash light toward the mirror.

Another object is to provide a simple means for sweeping a sheet of high candle power light across a slot repeatedly with great rapidity so that the light will intermittently illuminate a glow bar which in turn will intermittently flash lights of great intensity toward a helical mirror that is operated to break up the sheet of light into dot-sized parts adapted for use in sending and receiving pictures. To that end I provide a drum having a gas burner connected thereto with a diaphragm closing one end of the drum and an electromagnet for vibrating the light flame from the burner so as to change its position relative to a fixed double concave lens so as to sweep the sheet of converged light across a slot as the position of the light is changed by vibration of the diaphragm.

Features of the invention are shown in the construction, combination and arrangement of parts whereby an apparatus for controlling and directing light is provided that is easy to construct, assemble and operate, and that is effective in operation and durable in use.

Other objects, advantages and features of invention may appear from the accompanying drawings, the subjoined detailed description and the appended claims.

The accompanying drawings illustrate the invention, in which:

Figure 1 is a diagrammatic perspective view of an apparatus for controlling and directing light that is constructed in accordance with this invention with the light directed through a double concave lens, narrow elongated slot and glow bar to a rotary mirror.

Fig. 2 is a view analogous to Fig. 1 with the light forming and control apparatus shown in central vertical section and showing an eye focused on the helical mirror, also showing the lamp flame arranged centrally on the horizontal line $a$—$b$ and its ray focused in the line so they pass through a slot and glow bar to a rotary mirror.

Fig. 3 is a diagrammatic view of the apparatus analogous to Fig. 1 showing the flame of the lamp below the horizontal center line $a$—$b$ with its light rays focused on a partition above the line so that the light does not illuminate the glow bar or mirror.

Fig. 4 is a view analogous to Fig. 3 with the lamp flame arranged above the horizontal center line a—b and showing its rays focused on a partition below the line a—b, so the glow bar and mirror are not illuminated.

Fig. 5 is a fragmental vertical section through the lamp burner showing the inclined air ducts that are arranged to discharge into the central gas passage whereby a proper mixing of air and gas is accomplished to cause a mixture capable of producing a flame of high candle power when ignited, also showing three positions of the flame.

Fig. 6 is a diagrammatic side view of a partition used in the apparatus and interposed between the lamp and mirror and having an elongated narrow horizontal slot through which the light rays are intermittently directed, the slot being shown many times larger than it is in use. It is exaggerated as to size to more clearly illustrate its purpose.

Fig. 7 is a view analogous to Fig. 1 with a lamp control of a condenser type, other parts of the apparatus being the same as shown in Fig. 1.

Fig. 8 is also a view analogous to Fig. 1 showing a lamp control of electrical type, other parts of the apparatus being the same as shown in Fig. 1.

Fig. 9 is a semidiagrammatic end view of the helical mirror used with the apparatus.

Fig. 10 is a semidiagrammatic side view of the mirror.

Fig. 11 is a fragmental central vertical section through the electrodes of the lamp shown in Fig. 8 showing various positions of the arc flame as controlled by the electromagnet.

The apparatus for controlling and directing light includes a simple means for producing a light flame 15 of sufficient candle power to effectively accomplish its purpose of illuminating dot size areas of a picture or the like successively so as to bring out all the characteristics therein; and this light can be produced in one of three simple ways, first by a gas lamp of the diaphragm type, as shown in Figs. 1 and 2, second by a gas lamp of the condenser type shown in Fig. 7, or third by the arc lamp shown in Figs. 8 and 11, and preferably in practice the latter is used.

The gas lamp of the diaphragm type includes a drum 16 having a closed end 17 on which the candle 18 is mounted and this candle is provided with a burner 19 through which there is a center gas passage 20 into which the inclined air ducts 21 are extended so as to provide the gas when ignited with sufficient oxygen to form a light of high candle power and relatively constant brilliancy. The detailed construction of the burner is best shown in Fig. 5. It is understood, however, that any suitable burner will do that will provide a light of suitable candle power.

The other end of the drum 16 is closed by a diaphragm 22 so that the gas fed into the drum through the pipe 23 can be discharged through the burner by a varied pressure, the diaphragm being vibrated for that purpose.

The diaphragm 22 is vibrated by an electromagnet 24 that is energized electrically through wires 124—224 by a source of electricity not shown but well understood in the art, the electromagnet being operated to vibrate the diaphragm with great rapidity so that alternately and at great speed the position of the lamp flame 15 is changed so as to change the position of its sheet of concentrated light which first is passed through the double-concave lens 25 arranged adjacent the side of the flame 15.

The lens 25 is arranged so that the rays from the light flame will focus adjacent a narrow elongated slot 26 in the partition 27 that is interposed between the lens and a helical composite rotary mirror 28; and arranged adjacent the slot 26 and between the partition and mirror is a glow bar 29 that is preferably formed of a cylindrical bar of quartz that extends the full length of the slot 26. This glow bar can be formed of glass or the like and it receives its light from the lamp and transfers it to the mirror. In other words the converged rays 30 from the flame 15 do not reach the mirror 28 but illuminate the glow bar 29 which in turn transfers the sheet of light rays 31 to the mirror where in turn they are reflected out to an object such as the eye shown in Fig. 2 or to a receiving and recording instrument, not shown, as they are well understood in the art and form no part of this invention.

The diaphragm 22 is vibrated for the purpose of rapidly changing the position of the flame 15 so as to sweep the sheet of converged light 30 across the slot 26 so that only intermittently and with great rapidity the glow bar will be illuminated to flash the light onward to the mirror 28. The flashes of light from the glow bar as observed by the naked eye will appear to be a steady uninterrupted light, but which in reality are separate lights easily detected by the sensitized film of a camera, the purpose of the intermittent light being to receive in dot size areas the scene being received from a remote station by television.

The action of the diaphragm on the gas flowing from the burner 19 is diagrammatically illustrated in Figs. 2, 3 and 4. In Fig. 2 the light flame 15 is assumed to be at an intermediate point between high and low pressure on the gas and arranged central to the horizontal line a—b with its sheet of light, directed through the slot 26 to illuminate the glow bar 29 which in turn flashes the rays 31 to the helical mirror 28.

In Fig. 3 it is assumed that the diaphragm is attracted toward the electromagnet 24, consequently effecting a slight suction on the gas and thereby causing the light flame 15 to fall below the horizontal line a—b alternating its position relative to the lens 25 so that its rays are deflected upward above the slot 26 and therefore do not illuminate the glow bar and consequently no light reaches the mirror.

In Fig. 4 it is assumed that the diaphragm 22 is actuated so as to drive the gas out of the drum with considerable force and raise the light flame 15 above the horizontal line a—b, which movement of the flame throws the sheet of light 30 below the slot 26 so that the glow bar and mirror are not illuminated. It is understood of course that when the sheet of light 30 is swept downward from the position shown in Fig. 2 to that shown in Fig. 3, and vice versa, it will cross the slot 26 and while crossing will illuminate the glow bar and flash a light to the mirror; and it is also understood that these intermittent flashes of light are repeated with such great rapidity that, to the naked eye, the mirror appears to be continuously illuminated.

In Fig. 7 I show the flame 15 oscillated by means of a condensor type gas lamp 32 that is electrically energized through the wires 33, 34 to cause a vibration of its spaced leaves 35 so as to cause a fluctuation of the flame 15 sufficient to sweep its converging rays 31 back and forth across the slot 26 for the purpose heretofore described.

In Fig. 8 I show the flame 15 oscillated by an arc lamp 36 adjacent to which I provide the electromagnet 24 for influencing the arc flame 15 so as to change its position relative to the lens 25 to sweep the sheet of light 30 across the slot 26. The various positions of the arc flame 15 as attracted or repelled by the electromagnet 24 are more fully illustrated in Fig. 11 in which the tube electrodes 50, 51 are shown connected to wires 136, 236 that receive electrical current from a source not shown.

In Figs. 9 and 10 I show semi-diagrammatic end and side elevations of the rotary helical mirror which are employed to receive the flashed rays of light from the glow bar 29. The detailed construction and operation of this mirror is shown in my United States Letters Patent No. 1753697 issued April 8, 1930 for reflecting and scanning apparatus.

The mirror 28 is made up of a plurality of rectangular units 40 arranged and secured together by a bolt 41 so as to form a helix and each of the units has a mirror edge adapted to receive and reflect its respective portion of the sheet of light from the glow bar as the mirror is rotated. The mirror can be rotated by a motor not shown in these drawings but shown and described in the patent above mentioned.

In operation the flame 15 is oscillated as described to cause an intermittent sheet of light to pass through the slot 26 to illuminate the glow bar 29 which in turn flashes its light to the mirror 28.

I claim as my invention:

1. An apparatus for controlling and directing light including means for causing a flame of relatively constant brilliancy and high candle power, a lens for directing a sheet of light toward a focal line, a composite rotary mirror beyond said focal line, a partition adjacent the focal line of said light and having a slot therethrough interposed between said mirror and flame, and means interposed between said partition and mirror for directing the sheet of light onward to said mirror.

2. The combination set forth in claim 1 and, means for moving said flame relative to said lens so as to repeatedly sweep the sheet of light therefrom across the slot in said partition so that intermittently said mirror will be illuminated.

3. An apparatus for controlling and directing light including a drum, a candle supported on the upper end of said drum, means for passing an inflammable gas through said drum and candle, upwardly and inwardly inclined air ducts for supplying air to said gas to cause a flame of relatively constant brilliancy and high candle power, a lens arranged adjacent said flame to focus the light therefrom in a focal line, a partition having an elongated narrow slot therethrough adjacent which said light is focused, a glow bar adjacent said slot and on the opposite side of said partition to said lens, a diaphragm at the other end of said drum, an electromagnet for vibrating said diaphragm to rapidly change the position of said flame relative to said lens to alternately sweep the light from said flame across the slot in said partition to intermittently illuminate said glow bar, and a composite rotary mirror for receiving the light from said bar.

In witness whereof, I have hereunto affixed my signature.

DELAMERE B. GARDNER.